United States Patent

[11] 3,619,540

| [72] | Inventor | David Robert Soworowski<br>Parma, Ohio |
|---|---|---|
| [21] | Appl. No. | 62,578 |
| [22] | Filed | Aug. 10, 1970 |
| [45] | Patented | Nov. 9, 1971 |
| [73] | Assignee | Park-Ohio Industries, Inc.<br>Cleveland, Ohio |

[54] HEATING ZONE DUAL INDUCTOR
8 Claims, 5 Drawing Figs.

[52] U.S. Cl. .................................... 219/10.71,
219/10.57, 219/10.67, 219/10.79
[51] Int. Cl. ..................................... H05b 5/00,
H05b 9/06
[50] Field of Search .......................... 219/10.67,
10.79, 10.57, 10.71

[56] References Cited
UNITED STATES PATENTS

| 2,321,189 | 6/1943 | Drawnees | 219/10.79 X |
| 2,468,687 | 2/1949 | Fuchs | 219/10.79 |
| 2,439,517 | 4/1948 | Johnson | 219/10.49 |
| 2,678,371 | 5/1954 | Andrew | 219/10.79 |

*Primary Examiner*—J. V. Truhe
*Assistant Examiner*—L. H. Bender
*Attorney*—Meyer, Tilberry and Body ABSTRACT: An induction heating device including an inductor defining two separate heating zones and means for alternately inserting a workpiece into each of these heating zones.

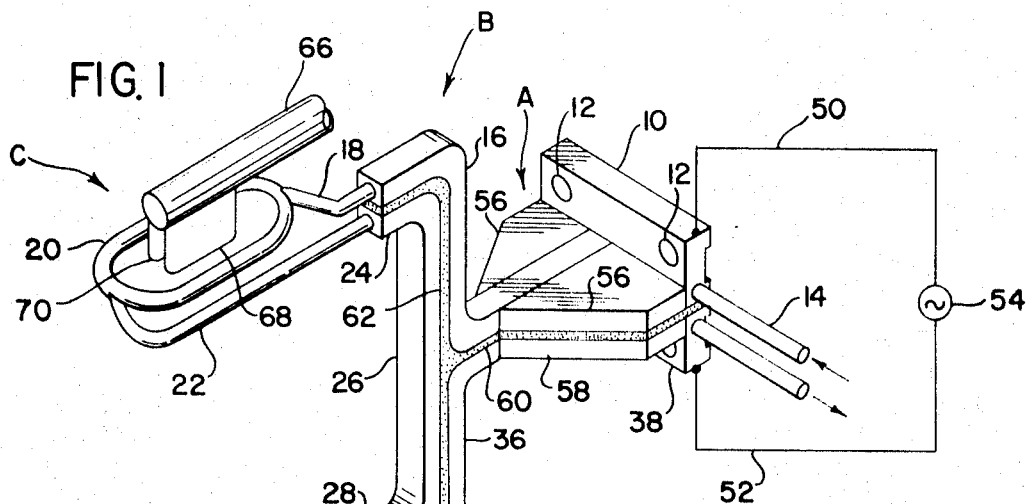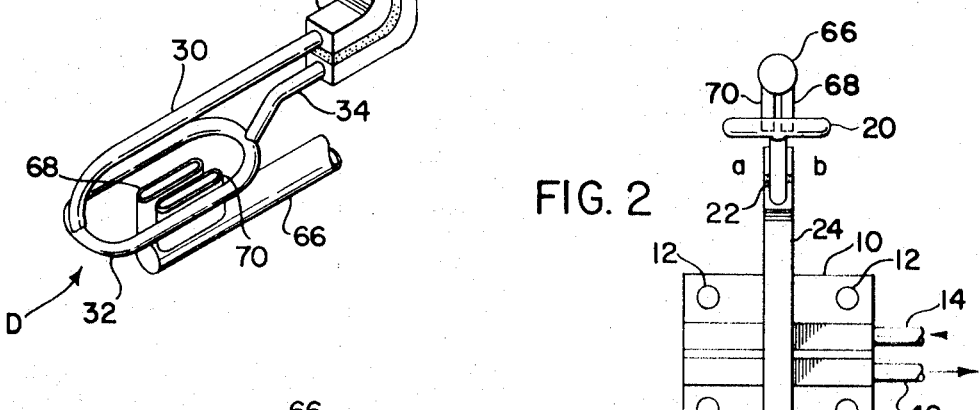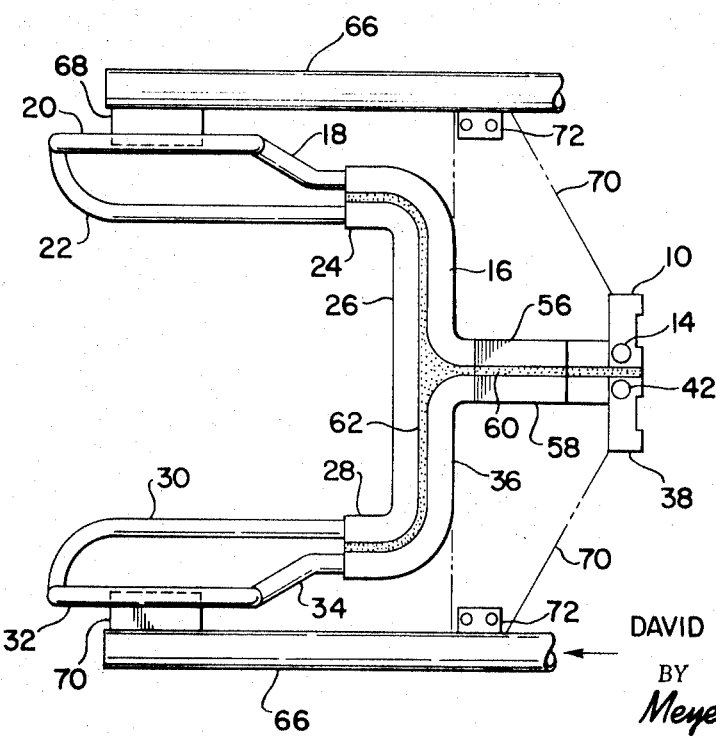

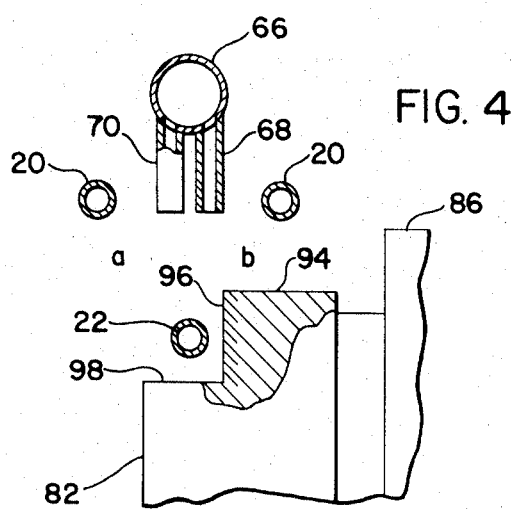
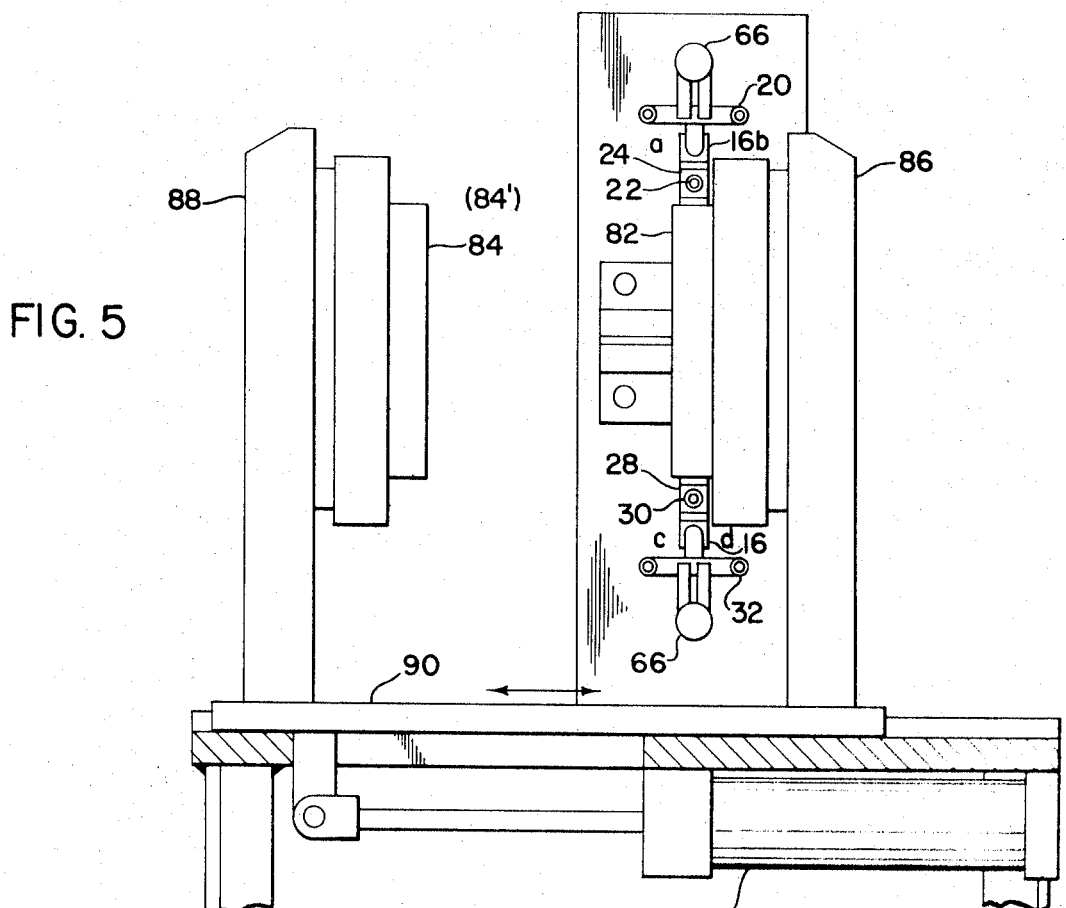

HEATING ZONE DUAL INDUCTOR

This application pertains to the art of induction heating and more particularly to an induction heating device including a dual heating zone inductor.

The invention is particularly applicable to inductively heating recessed or stepped workpieces and will be described with particular reference thereto; however, it will be appreciated that the invention has broader applications and can be used to heat various-shaped workpieces.

It is well known in the art to employ induction heating devices for heat-treating purposes. Most commonly, these devices have taken the form of helical coils formed from an electrical conductor. High-frequency electrical current is passed through the coil so that workpieces which are passed longitudinally therethrough are inductively heated. Induction heating is preferred over other heating methods for many reasons, including, for example, cleanliness, floorspace requirements and speed of heating.

When a workpiece has an irregular shape or only a portion of the workpiece is to be heated, then it is not convenient to pass the workpiece through a helical-type inductor. In these instances, it had become somewhat common practice to provide a specially formed inductor means for holding the workpiece adjacent the inductor in order that the portion to be heated is inductively coupled with the inductor. This type of installation inherently produced a relatively slow production rate. The workpiece was first properly positioned and then the inductor was energized. After this, the workpiece was quenched while still within the influence of the inductor or removed and quenched in a separate location. Following this, the next workpiece was positioned with respect to the inductor, and the cycle repeated. Such an arrangement did not make efficient use of the inductor due to the lapse of time incurred between unloading and loading workpieces. The present invention is directed toward this type of an induction heating installation and provides a successful solution to increasing its productivity.

In accordance with the present invention, there is provided an improvement in an induction heating device which includes an inductor for heating a workpiece and means for supporting the workpiece with respect to the inductor. The improvement is the provision of a first portion of the inductor defining a first heating zone, a second portion of the inductor defining a second heating zone, means for moving a first workpiece into a position with the first workpiece adjacent the first zone, second means for moving a second workpiece into a position with the second workpiece adjacent the second zone and means for alternating the operation of the first and second means.

In accordance with a more limited aspect of the present invention, there is provided an inductor that includes a closed loop made of a conductive material and two conductors electrically connected to the loop. One of these conductors extends back past the loop so that there is formed an elongated T-shaped conductor with the closed loop forming the top portion of the T and return conductor which extends back past the closed loop forming the leg. A portion of the loop and the return conductor forms a first heating zone. A second portion of the loop and the return conductor forms a second heating zone. Quench means are disposed on the opposite side of the loop from the leg portion of the T. High-frequency electrical current is passed through the conductors and is substantially equally divided between the legs of the loop and is used by both heating zones. The conductor forming the leg portion of the T is employed as the primary leg of the inductor while the legs of the loop act as the secondary legs in order to control the flux of the primary leg. Workpieces may be alternately introduced in proximity with both heating zones in order that one workpiece may be heated while another is being positioned for heating.

It is a principal object of the present invention to provide an inductor which can be employed for inductively heating workpieces at a more rapid rate.

A further object of the present invention is to provide an inductor in which both sides thereof may be utilized for heating in order that workpieces may be fed into proximity with the inductor from two different directions.

Still another object of the present invention is to provide an inductor which has primary and secondary inductor legs which permit the flux in the primary conductor to be regulated.

The invention may take physical form in certain parts and arrangements of parts, a preferred embodiment of which will be described in detail in this specification and illustrated in the accompanying drawings which form a part hereof and wherein:

FIG. 1 is a perspective view of an inductor in accordance with the present invention;

FIG. 2 is a front view of the inductor shown in FIG. 1;

FIG. 3 is a side view of the inductor shown in FIG. 1;

FIG. 4 is an enlarged view of one of the inductor heads of this invention with an irregular workpiece positioned relative thereto; and, FIG. 5 is a front view of an inductor in accordance with the present invention showing how workpieces may be fed into proximity with the inductor from two directions.

Referring now to the drawings wherein the showings are for the purpose of illustrating the preferred embodiment of the invention only and not for purposes of limiting same, FIG. 1 depicts the inductor of this invention which is generally comprised of inductor bus A U-shaped body member B, upper inductor head C and lower inductor head D. Referring now to FIGS. 1, 2 and 3, the inductor of this invention includes first base member 10 constructed from an electrically conducted material, such as for example, copper. Base 10 is provided with a plurality of leg holes 12 which may be used in fastening the inductor to the outlet leads of a power source and is also provided with coolant supply conduit 14 which passes into internal channels (not shown) within base 10. Mounted to base 10 by brazing or other convenient means is copper conductor element 16 which is also hollow for the purposes of receiving the circulating coolant entering the inductor through supply conduit 14. As can best be seen in FIG. 3, element 16 forms a portion of U-shaped body member B.

Upper inductor head C is comprised of hollow generally cylindrical cross-sectioned conductors 18, 20 and 22. Conductor 18 extends outwardly from element 16 and has attached thereto closed-loop conductor 20 which divides a flow of electrical current. Attached to the opposite end of loop 20 from conductor 18, is leg element 22 which extends to and is conveniently mounted on outwardly extending leg 24 of hollow copper conductor element 26 of U-shaped body element B. Oppositely disposed from leg 24 is leg element 28 to which leg 30 of lower inductor head D is conveniently mounted. Lower inductor head D is identical with upper inductor head C and is comprised of leg element 30, loop 32 and conductor 34. Conductor 34 is attached to hollow copper conductor element 36 which forms another portion of body member B. Conveniently mounted, such as by brazing, at the opposite extremity of element 36, and symmetrical with first base member 10, is second base member 38. As with base 10, base 38 includes a plurality leg holes 40 and internal chambers (not shown) connected to fluid outlet conduit 42 whereby coolant is permitted to exit from the inductor. It should be noted here that all the inductor elements are hollow and interconnected with a coolant supply and return conduits in order that coolant may be continuously passed through all parts of the inductor.

Base members 10, 38 are connected to electrical leads generally designated 50, 52 which are interconnected with a source of high-frequency electrical current schematically illustrated as generator 54. Copper plate members 56, 58 are brazed to members 10, 16 and 36, 38 respectively in order to form the inductor bus. These copper plate sections are triangular in peripheral configuration. To provide a unitary structure, base members 10, 38 and hollow copper conductor elements 16, 36 may be connected together in any convenient manner with an electrical insulating material 60 therebetween. If nut and bolt means are the connecting devices utilized, electrically insulating sleeves and washers should be employed in order to avoid short circuiting. In like manner, hollow copper conductor element 26 may be fastened to conductors 16, 36 as long as an electrically insulating material 62 is similarly provided therebetween. As can best be seen in FIGS. 2 and 3, the above-described structure establishes an inductor with two oppositely disposed elongated T-shaped induction heating heads C and D. The planes of loops 20, 32 are in a parallel spaced-apart relationship with the planes of conductor elements 22, 30 being normal thereto. As best shown in FIG. 2, this arrangement provides for induction heating areas generally designated a, b, c and d. It is to be appreciated that other conductor configurations may be employed to make up the inductor, the above defined structure merely being one embodiment. In the subject apparatus, the heated workpiece is quenched by quenching conduits 66 which deliver water or other quenching fluid to the workpiece surface in proximity with the heads. Each conduit is provided with nozzles 68, 70 in order to provide more effective distribution of quenching fluid to separate heating zones a, b, c and d. Conduits 66 lead to a quenching fluid supply source remote from the apparatus (not shown). FIG. 3 includes one embodiment for mounting quenching conduits 66 relative to the inductor itself. This means merely employs frame members 70 mounted to conductor elements 16, 36 which extend upwardly and downwardly a distance beyond loop areas 20, 32. Quenching conduits 66 are mounted to the extremities of frame members 70 by brackets 72 in any convenient manner.

FIGS. 4 and 5 illustrate the apparatus as described above with reference to FIGS. 1, 2 and 3 as it is employed for heating and quenching irregularly shaped workpieces in accordance with the present invention. For purposes of illustration only, it will be assumed that workpieces generally designated 82, 84 are flanged cylindrical workpieces on which it is desired to heat-treat only one surface of the flange. In FIGS. 4 and 5, the U-shaped portion of the inductor is represented by 16, 24 and 28; the legs of the loops of the inductor are shown as 20, 32; and, the primary leg elements are shown as 22, 30. Workpieces 82, 84 are mounted on locators 86, 88 of a known type which function to center the workpieces for placement into the inductor. These locators are provided with means for rotating the workpieces (not shown for purposes of simplicity) to permit development of uniform heat patterns in the workpieces during heating and are mounted on shuttle plate 90 which is moveable from left to right in the view of FIG. 5 by fluid cylinder means 92. This provides means whereby the workpieces may be conveniently moved into and out of inductive coupling with the inductor. It is to be understood that the shuttle plate apparatus itself described above forms no part of the present invention and that other shuttle apparatus may be effectively employed in carrying out the subject invention.

In operation, and with particular reference to FIG. 5, workpiece 82 is positioned on locator 86 and is then moved into inductive coupling with primary conductors 22, 30, one side of loop 20 and the same side of loop 32. Thus, workpiece 82 is magnetically coupled inductor heads C and D at heating zones b and d. Simultaneous therewith, previously heated and quenched workpiece 84 on locator 88 is moved away from heating zones a and c of the inductor. While the workpiece 82 positioned on locator 86 is being heated by the inductor unit, hardened workpiece 84 is removed from locator 88 and a new workpiece 84' is placed thereon ready for processing. The cycle is repeated, heating workpiece 84' with zones a and c while workpiece 82 is removed. By using this inductor configuration, the inductor may be used with a minimum amount of idle time involved.

FIG. 4 illustrates another aspect of the present invention. Again, the same flanged cylinder or workpiece 82, with surface areas 94, 96 and 98, is desired to be heat-treated such that only surface 86 of the flange is to be actually heated. It is to be understood that the operation of only one inductor head is shown in FIG. 4, the other being identical thereto. Workpiece 82 is placed on locator 86 and brought into inductive coupling with an inductor in accordance with the present invention as hereinabove described so that surface 96 is inductively coupled with primary inductor 22, secondary inductor 20 controlling inductive coupling. Because of the particular design of upper and lower inductor heads C and D, lines of magnetic flux will be concentrated between secondary inductor 20 and primary inductor 22 such that surface 96 will intercept most of the lines of magnetic flux issuing therebetween to be selectively heat-treated to the exclusion of surfaces 94, 98.

The invention has been described with reference to the preferred embodiment. Obviously modifications and alterations will occur to others upon a reading and understanding of this specification. It is my intention to include all such modification alterations insofar as they come within the scope of the appended claims or the equivalence thereof.

Having thus defined my invention, I claim:

1. An induction heating device for inductively heating a portion of a workpiece, said device comprising:

an inductor including a first portion defining a first heating zone facing in a first direction and a second portion defining a second, separate, heating zone facing in a second direction, different from said first direction, said portions being adjacent each other;

first means for supporting a workpiece adjacent said inductor with a portion of said workpiece magnetically coupled with said first heating zone;

second means for supporting a workpiece adjacent said inductor with a portion of said workpiece magnetically coupled with said second heating zone; and, means for alternately inserting a workpiece in said first and second means whereby only one workpiece is being heated at any one time.

2. The induction heating device defined in claim 1 further including quench means adjacent said first and second heating zones for quenching heated workpieces.

3. The induction heating device as defined in claim 1 wherein said inductor is comprised of a first conductor leg portion lying in a first plane and a second conductor return portion electrically interconnected with and spaced from said first portion, said second portion being coextensive with said first portion.

4. The induction heating device as defined in claim 3 wherein said first portion comprises a closed conductive loop and said second portion comprises a conductor element connected to one end of said loop and disposed so as to pass over said loop in a spaced-apart relationship therewith.

5. The induction heating device as defined in claim 4 wherein said first heating zone is formed between one side of said conductor element and said loop and said second heating zone is formed between the other side of said conductor element and said loop.

6. The induction heating device as defined in claim 1 wherein said inductor includes third and fourth adjacent portions, said third portion further defining said first heating zone, said fourth portion further defining said second heating zone, and said third and fourth portions being adjacent to each other.

7. The induction heating device as defined in claim 1 wherein said means for alternately inserting comprises means for moving said first and second means between a first position remote to said heating zone to a second position with a portion of said workpiece adjacent one of said heating zones.

8. In an induction heating device comprising an inductor for heating a workpiece and means for supporting the workpiece with respect to the inductor, the improvement comprising:

said inductor including a first portion defining a first heating zone, and a second portion defining a second heating zone;

first means for moving a first workpiece into a position with said first workpiece adjacent said first zone;

second means for moving a second workpiece into a position with said second workpiece adjacent said second zone; and, means for alternating the operation of said first and second means.

* * * * *